(12) United States Patent
Satish et al.

(10) Patent No.: US 11,658,998 B2
(45) Date of Patent: *May 23, 2023

(54) TRANSLATING SECURITY ACTIONS INTO COMPUTING ASSET-SPECIFIC ACTION PROCEDURES

(71) Applicant: Splunk Inc., San Francisco, CA (US)

(72) Inventors: Sourabh Satish, Fremont, CA (US); Oliver Friedrichs, Woodside, CA (US); Atif Mahadik, Fremont, CA (US); Govind Salinas, Sunnyvale, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/306,703

(22) Filed: May 3, 2021

(65) Prior Publication Data
US 2021/0258340 A1    Aug. 19, 2021

Related U.S. Application Data

(63) Continuation of application No. 16/539,918, filed on Aug. 13, 2019, now Pat. No. 11,019,093, which is a
(Continued)

(51) Int. Cl.
*H04L 9/40* (2022.01)
*G06F 21/55* (2013.01)
(Continued)

(52) U.S. Cl.
CPC ........ *H04L 63/1441* (2013.01); *G06F 16/285* (2019.01); *G06F 21/554* (2013.01);
(Continued)

(58) Field of Classification Search
CPC ............. H04L 63/1441; H04L 63/0236; H04L 63/1416; H04L 63/1425; H04L 63/1433; H04L 63/20; H04L 47/2425; G06F 21/554
See application file for complete search history.

(56) References Cited

U.S. PATENT DOCUMENTS 6,405,318 B1    6/2002  Rowland
7,076,803 B2    7/2006  Bruton et al.
(Continued)

OTHER PUBLICATIONS

Aguirre, Idoia; Alonso, Sergio; "Improving the Automation of Security Information Management: A Collaborative Approach", IEEE Security & Privacy, vol. 10, Issue 1, Oct. 25, 2011, pp. 55-59.
(Continued)

*Primary Examiner* — Hosuk Song
(74) *Attorney, Agent, or Firm* — Nicholson De Vos Webster & Elliott LLP

(57) ABSTRACT

Systems, methods, and software described herein enhances how security actions are implemented within a computing environment. In one example, a method of implementing security actions for a computing environment comprising a plurality of computing assets includes identifying a security action in a command language for the computing environment. The method further provides identifying one or more computing assets related to the security action, and obtaining hardware and software characteristics for the one or more computing assets. The method also includes translating the security action in the command language to one or more action procedures based on the hardware and software characteristics, and initiating implementation of the one or more action procedures in the one or more computing assets.

20 Claims, 5 Drawing Sheets

Related U.S. Application Data continuation of application No. 16/107,975, filed on Aug. 21, 2018, now Pat. No. 10,425,441, which is a continuation of application No. 15/699,454, filed on Sep. 8, 2017, now Pat. No. 10,158,663, which is a continuation of application No. 14/689,973, filed on Apr. 17, 2015, now Pat. No. 9,762,607.

(60) Provisional application No. 62/106,830, filed on Jan. 23, 2015, provisional application No. 62/106,837, filed on Jan. 23, 2015, provisional application No. 62/087,025, filed on Dec. 3, 2014.

(51) Int. Cl.
*G06F 16/28* (2019.01)
*H04L 47/2425* (2022.01)

(52) U.S. Cl.
CPC ...... *H04L 63/0236* (2013.01); *H04L 63/1416* (2013.01); *H04L 63/1425* (2013.01); *H04L 63/1433* (2013.01); *H04L 63/20* (2013.01); *H04L 47/2425* (2013.01)

(56) References Cited

U.S. PATENT DOCUMENTS

| | | | |
|---|---|---|---|
| 7,127,743 B1 | 10/2006 | Khanolkar et al. | |
| 7,174,566 B2 | 2/2007 | Yadav | |
| 7,469,301 B2 | 12/2008 | Daniell et al. | |
| 7,617,533 B1 | 11/2009 | Hernacki | |
| 7,657,927 B2 * | 2/2010 | Tajalli | G06F 21/316 726/1 |
| 7,900,259 B2 | 3/2011 | Jeschke et al. | |
| 7,950,056 B1 | 5/2011 | Satish et al. | |
| 8,042,171 B1 | 10/2011 | Nordstrom et al. | |
| 8,103,875 B1 | 1/2012 | Ramzan et al. | |
| 8,146,147 B2 | 3/2012 | Litvin et al. | |
| 8,185,953 B2 | 5/2012 | Rothstein et al. | |
| 8,261,317 B2 | 9/2012 | Litvin et al. | |
| 8,271,642 B1 | 9/2012 | Sankararaman et al. | |
| 8,291,495 B1 | 10/2012 | Burns et al. | |
| 8,336,094 B2 * | 12/2012 | Litvin | H04L 63/0263 718/1 |
| 8,380,828 B1 | 2/2013 | Schlichter et al. | |
| 8,402,540 B2 | 3/2013 | Kapoor et al. | |
| 8,484,338 B2 | 7/2013 | Paster | |
| 8,516,575 B2 | 8/2013 | Burnside et al. | |
| 8,590,035 B2 * | 11/2013 | Aaron | H04L 63/0227 726/13 |
| 8,627,466 B2 | 1/2014 | Fisher et al. | |
| 8,676,970 B2 | 3/2014 | Boyns et al. | |
| 8,756,697 B2 | 6/2014 | Ocepek et al. | |
| 8,856,910 B1 | 10/2014 | Rostami-Hesarsorkh et al. | |
| 8,881,282 B1 | 11/2014 | Aziz et al. | |
| 8,914,878 B2 | 12/2014 | Burns et al. | |
| 8,924,469 B2 | 12/2014 | Raleigh et al. | |
| 8,943,123 B2 | 1/2015 | Miyazaki et al. | |
| 8,949,931 B2 | 2/2015 | Ermagan et al. | |
| 8,955,107 B2 | 2/2015 | Eyada | |
| 9,009,814 B1 | 4/2015 | Wertz et al. | |
| 9,009,824 B1 | 4/2015 | Chen et al. | |
| 9,049,226 B1 | 6/2015 | Duane | |
| 9,137,258 B2 | 9/2015 | Haugsnes | |
| 9,166,995 B1 | 10/2015 | Roundy | |
| 9,231,964 B2 | 1/2016 | Cross et al. | |
| 9,256,739 B1 | 2/2016 | Roundy et al. | |
| 9,258,319 B1 | 2/2016 | Rubin | |
| 9,306,965 B1 | 4/2016 | Grossman et al. | |
| 9,311,479 B1 | 4/2016 | Manni et al. | |
| 9,313,211 B1 | 4/2016 | Lototskiy | |
| 9,325,733 B1 | 4/2016 | Kolman et al. | |
| 9,336,385 B1 | 5/2016 | Spencer et al. | |
| 9,338,181 B1 | 5/2016 | Burns et al. | |
| 9,344,445 B2 | 5/2016 | Burns et al. | |
| 9,378,361 B1 | 6/2016 | Yen et al. | |
| 9,396,592 B2 | 7/2016 | Chapman et al. | |
| 9,489,516 B1 | 11/2016 | Lu et al. | |
| 9,680,846 B2 | 6/2017 | Haugsnes | |
| 9,712,555 B2 | 7/2017 | Satish et al. | |
| 9,729,572 B1 | 8/2017 | Adams et al. | |
| 9,762,607 B2 | 9/2017 | Satish et al. | |
| 9,871,818 B2 | 1/2018 | Satish et al. | |
| 9,954,888 B2 | 4/2018 | Satish et al. | |
| 10,158,663 B2 | 12/2018 | Satish et al. | |
| 10,257,227 B1 | 4/2019 | Stickle et al. | |
| 10,425,440 B2 | 9/2019 | Satish et al. | |
| 10,425,441 B2 | 9/2019 | Satish et al. | |
| 10,476,905 B2 | 11/2019 | Satish et al. | |
| 10,986,120 B2 | 4/2021 | Satish et al. | |
| 11,019,092 B2 | 5/2021 | Satish et al. | |
| 11,019,093 B2 * | 5/2021 | Satish | H04L 63/1425 |
| 11,165,812 B2 | 11/2021 | Satish et al. | |
| 2004/0003286 A1 | 1/2004 | Kaler et al. | |
| 2004/0054498 A1 | 3/2004 | Shipp | |
| 2004/0111637 A1 | 6/2004 | Baffes et al. | |
| 2004/0250133 A1 | 12/2004 | Lim | |
| 2005/0055578 A1 | 3/2005 | Wright et al. | |
| 2005/0216956 A1 | 9/2005 | Orr et al. | |
| 2005/0235360 A1 | 10/2005 | Pearson | |
| 2005/0273857 A1 | 12/2005 | Freund | |
| 2006/0010493 A1 | 1/2006 | Piesco et al. | |
| 2006/0048209 A1 | 3/2006 | Shelest et al. | |
| 2006/0059568 A1 | 3/2006 | Smith-Mickelson et al. | |
| 2006/0095965 A1 | 5/2006 | Phillips et al. | |
| 2006/0117386 A1 | 6/2006 | Gupta et al. | |
| 2006/0174342 A1 | 8/2006 | Zaheer et al. | |
| 2007/0168874 A1 | 7/2007 | Kloeffer et al. | |
| 2007/0169194 A1 | 7/2007 | Church et al. | |
| 2007/0255724 A1 | 11/2007 | Jung et al. | |
| 2008/0005782 A1 | 1/2008 | Aziz | |
| 2008/0082662 A1 | 4/2008 | Dandliker et al. | |
| 2008/0289028 A1 | 11/2008 | Jansen et al. | |
| 2009/0037548 A1 | 2/2009 | Ordille et al. | |
| 2009/0165132 A1 | 6/2009 | Jain et al. | |
| 2010/0100962 A1 | 4/2010 | Boren | |
| 2010/0162347 A1 | 6/2010 | Barile | |
| 2010/0169973 A1 | 7/2010 | Kim et al. | |
| 2010/0251329 A1 | 9/2010 | Wei | |
| 2010/0319004 A1 | 12/2010 | Hudson et al. | |
| 2010/0319069 A1 | 12/2010 | Granstedt et al. | |
| 2010/0325412 A1 | 12/2010 | Norrman et al. | |
| 2010/0325685 A1 | 12/2010 | Sanbower | |
| 2011/0161452 A1 | 6/2011 | Poornachandran et al. | |
| 2012/0210434 A1 | 8/2012 | Curtis et al. | |
| 2012/0224057 A1 | 9/2012 | Gill et al. | |
| 2012/0331553 A1 | 12/2012 | Aziz et al. | |
| 2013/0007882 A1 | 1/2013 | Devarajan et al. | |
| 2013/0081138 A1 | 3/2013 | Rados et al. | |
| 2013/0081141 A1 | 3/2013 | Anurag | |
| 2013/0104203 A1 | 4/2013 | Davis et al. | |
| 2013/0276108 A1 | 10/2013 | Blackwell | |
| 2013/0291106 A1 | 10/2013 | Simonoff et al. | |
| 2013/0298230 A1 | 11/2013 | Kumar et al. | |
| 2013/0298244 A1 | 11/2013 | Kumar et al. | |
| 2013/0312092 A1 | 11/2013 | Parker | |
| 2013/0333032 A1 | 12/2013 | Delatorre et al. | |
| 2014/0007222 A1 | 1/2014 | Qureshi et al. | |
| 2014/0059641 A1 | 2/2014 | Chapman et al. | |
| 2014/0082726 A1 | 3/2014 | Dreller et al. | |
| 2014/0089039 A1 | 3/2014 | McClellan | |
| 2014/0137257 A1 | 5/2014 | Martinez et al. | |
| 2014/0165200 A1 | 6/2014 | Singla | |
| 2014/0165207 A1 | 6/2014 | Engel et al. | |
| 2014/0199663 A1 | 7/2014 | Sadeh-Koniecpol et al. | |
| 2014/0237599 A1 | 8/2014 | Gertner et al. | |
| 2014/0259170 A1 | 9/2014 | Amsler | |
| 2014/0283049 A1 | 9/2014 | Shnowske et al. | |
| 2014/0310811 A1 | 10/2014 | Hentunen | |
| 2014/0344926 A1 | 11/2014 | Cunningham et al. | |
| 2014/0351441 A1 | 11/2014 | Madani et al. | |
| 2014/0351940 A1 | 11/2014 | Loder et al. | |
| 2015/0040217 A1 | 2/2015 | Abuelsaad et al. | |
| 2015/0143516 A1 | 5/2015 | Sharpe et al. | |

(56) References Cited

U.S. PATENT DOCUMENTS

| | | | |
|---|---|---|---|
| 2015/0207813 A1 | 7/2015 | Reybok et al. |
| 2015/0215325 A1 | 7/2015 | Ogawa |
| 2015/0222647 A1 | 8/2015 | Lietz et al. |
| 2015/0222656 A1 | 8/2015 | Haugsnes |
| 2015/0304169 A1 | 10/2015 | Milman et al. |
| 2015/0334132 A1 | 11/2015 | Zombik et al. |
| 2015/0341384 A1 | 11/2015 | Mandayam et al. |
| 2015/0347751 A1 | 12/2015 | Card et al. |
| 2015/0347949 A1 | 12/2015 | Dwyer et al. |
| 2015/0365438 A1 | 12/2015 | Carver et al. |
| 2015/0381641 A1 | 12/2015 | Cabrera et al. |
| 2015/0381649 A1 | 12/2015 | Schultz et al. |
| 2016/0006749 A1 | 1/2016 | Cohen et al. |
| 2016/0065608 A1 | 3/2016 | Futty |
| 2016/0072836 A1 | 3/2016 | Hadden et al. |
| 2016/0103992 A1 | 4/2016 | Roundy et al. |
| 2016/0119379 A1 | 4/2016 | Nadkarni |
| 2016/0164893 A1 | 6/2016 | Levi |
| 2016/0164917 A1 | 6/2016 | Friedrichs et al. |
| 2016/0241580 A1 | 8/2016 | Watters et al. |
| 2016/0241581 A1 | 8/2016 | Watters et al. |
| 2017/0237762 A1 | 8/2017 | Ogawa |
| 2020/0396237 A1 | 12/2020 | Cohen et al. |

OTHER PUBLICATIONS

Final Office Action from U.S. Appl. No. 14/674,679, dated Sep. 22, 2016, 19 pages.
Final Office Action from U.S. Appl. No. 14/677,493, dated Aug. 24, 2017, 29 pages.
Final Office Action from U.S. Appl. No. 14/824,262, dated Apr. 6, 2017, 22 pages.
Final Office Action from U.S. Appl. No. 14/868,553, dated Oct. 15, 2018, 19 pages.
Final Office Action from U.S. Appl. No. 14/868,553, dated Oct. 18, 2017, 19 pages.
Final Office Action from U.S. Appl. No. 14/956,589, dated Nov. 22, 2017, 27 pages.
Final Office Action from U.S. Appl. No. 15/924,759, dated Aug. 1, 2018, 13 pages.
Final Office Action received for U.S. Appl. No. 16/182,914, dated Sep. 18, 2019, 6 pages.
Final Office Action, U.S. Appl. No. 14/675,176, dated Nov. 25, 2016, 21 pages.
Final Office Action, U.S. Appl. No. 14/675,176, dated Sep. 25, 2017, 31 pages.
Final Office Action, U.S. Appl. No. 14/677,493, dated Jan. 16, 2020, 16 pages.
Non-Final Office Action from U.S. Appl. No. 15/886,183, dated Mar. 22, 2018, 21 pages.
Non-Final Office Action from U.S. Appl. No. 16/107,972, dated Dec. 31, 2018, 11 pages.
Non-Final Office Action from U.S. Appl. No. 16/142,913, dated Apr. 30, 2019, 33 pages.
Non-Final Office Action from U.S. Appl. No. 14/674,679, dated Jun. 2, 2016, 16 pages.
Non-Final Office Action from U.S. Appl. No. 14/675,075, dated Jul. 11, 2016, 13 pages.
Non-Final Office Action from U.S. Appl. No. 14/689,926, dated May 8, 2017, 34 pages.
Non-Final Office Action from U.S. Appl. No. 14/689,973, dated Jan. 25, 2017, 18 pages.
Non-Final Office Action from U.S. Appl. No. 14/824,262, dated Jul. 13, 2017, 20 pages.
Non-Final Office Action from U.S. Appl. No. 14/824,262, dated Oct. 7, 2016, 16 pages.
Non-Final Office Action from U.S. Appl. No. 14/868,553, dated Mar. 26, 2018, 22 pages.
Non-Final Office Action from U.S. Appl. No. 14/868,553, dated May 26, 2017, 16 pages.
Non-Final Office Action from U.S. Appl. No. 14/956,589, dated May 31, 2017, 33 pages.
Non-Final Office Action from U.S. Appl. No. 14/956,615, dated Jul. 28, 2017, 46 pages.
Non-Final Office Action from U.S. Appl. No. 15/699,454, dated Feb. 8, 2018, 19 pages.
Non-Final Office Action from U.S. Appl. No. 16/107,975, dated Jan. 4, 2019, 11 pages.
Non-Final Office Action from U.S. Appl. No. 16/107,979, dated Oct. 18, 2018, 14 pages.
Non-Final Office Action from U.S. Appl. No. 16/182,914, dated May 30, 2019, 23 pages.
Non-Final Office Action, U.S. Appl. No. 14/675,176, dated Apr. 17, 2017, 22 pages.
Non-Final Office Action, U.S. Appl. No. 14/675,176, dated Jul. 18, 2016, 18 pages.
Non-Final Office Action, U.S. Appl. No. 16/042,283, dated Jan. 24, 2020, 25 pages.
Non-Final Office Action, U.S. Appl. No. 16/539,918, dated Jul. 16, 2020, 14 pages.
Non-Final Office Action, U.S. Appl. No. 16/568,949, dated Mar. 19, 2020, 18 pages.
Notice of Allowance from U.S. Appl. No. 14/674,679, dated Apr. 18, 2017, 20 pages.
Notice of Allowance from U.S. Appl. No. 14/689,926, dated Nov. 8, 2017, 22 pages.
Notice of Allowance from U.S. Appl. No. 14/689,973, dated Jul. 27, 2017, 33 pages.
Notice of Allowance from U.S. Appl. No. 14/824,262, dated Nov. 22, 2017, 7 pages.
Notice of Allowance from U.S. Appl. No. 14/956,589, dated Apr. 23, 2018, 21 pages.
Notice of Allowance from U.S. Appl. No. 14/956,615, dated Dec. 18, 2017, 19 pages.
Notice of Allowance from U.S. Appl. No. 15/699,454, dated Aug. 9, 2018, 11 pages.
Notice of Allowance from U.S. Appl. No. 15/845,963, dated Jun. 26, 2018, 11 pages.
Notice of Allowance from U.S. Appl. No. 15/886,183, dated Sep. 19, 2018, 9 pages.
Notice of Allowance from U.S. Appl. No. 15/924,759, dated Jun. 13, 2019, 21 pages.
Notice of Allowance from U.S. Appl. No. 16/107,972, dated May 9, 2019, 18 pages.
Notice of Allowance from U.S. Appl. No. 16/107,975, dated May 13, 2019, 18 pages.
Notice of Allowance, U.S. Appl. No. 14/675,176, dated Dec. 30, 2019, 6 pages.
Notice of Allowance, U.S. Appl. No. 14/689,973, dated Aug. 10, 2017, 6 pages.
Notice of Allowance, U.S. Appl. No. 14/824,262, dated Jan. 5, 2018, 4 pages.
Notice of Allowance, U.S. Appl. No. 15/699,454, dated Nov. 20, 2018, 6 pages.
Non-Final Office Action, U.S. Appl. No. 16/863,557, dated Nov. 24, 2021, 17 pages.
Notice of Allowance, U.S. Appl. No. 17/033,146, dated Jan. 10, 2022, 10 pages.
Notice of Allowance, U.S. Appl. No. 16/107,979, dated Oct. 7, 2019, 14 pages.
Notice of Allowance, U.S. Appl. No. 16/142,913, dated Aug. 30, 2019, 21 pages.
Notice of Allowance, U.S. Appl. No. 16/182,914, dated Dec. 4, 2019, 5 pages.
Notice of Allowance, U.S. Appl. No. 16/539,918, dated Jan. 22, 2021, 7 pages.
Paudice, Andrea; Sarkar, Santonu; Cotroneo, Dominco; "An Experiment with Conceptual Clustering for the Analysis of Security Alerts", IEEE International Symposium on Software Reliability Engineering Workshops, Nov. 3-6, 2014, pp. 335-340.
Final Office Action, U.S. Appl. No. 14/675,176, dated Jan. 26, 2021, 18 pages.

(56) References Cited

OTHER PUBLICATIONS

Final Office Action, U.S. Appl. No. 16/568,949, dated Oct. 28, 2020, 19 pages.

Final Office Action, U.S. Appl. No. 16/736,120, dated Jan. 6, 2021, 15 pages.

Hasegawa, Hirokazu; Yamaguchi, Yukiko; Shimada, Hajime; Takakura; Hiroki; "A Countermeasure Recommendation System against Targeted Attacks with Preserving Continuity of Internal Networks", 38th Annual Computer Software and Applications Conference, IEEE, Jul. 21-25, 2014, pp. 400-405.

Hershey, Paul C., Ph.D.; Silio, Jr., Charles B., Ph.D.; "Procedure for Detection of and Response to Distributed Denial of Service Cyber Attacks on Complex Enterprise Systems", International Systems Conference SysCon, IEEE, Mar. 19-22, 2012, 6 pages.

Non-Final Office Action, U.S. Appl. No. 14/675,176, dated Jul. 14, 2020, 18 pages.

Non-Final Office Action, U.S. Appl. No. 14/677,493, dated Jul. 14, 2020, 18 pages.

Non-Final Office Action, U.S. Appl. No. 16/699,299, dated Apr. 29, 2021, 10 pages.

Non-Final Office Action, U.S. Appl. No. 16/736,120, dated Sep. 22, 2020, 14 pages.

Tejay, Gurvirender P.S.; Zadig, Sean M.; "Investigating the Effectiveness of IS Security Countermeasures Towards Cyber Attacker Deterrence", 45th Hawaii International Conference on System Sciences, IEEE, Jan. 4-7, 2012, pp. 3051-3060.

Final Office Action, U.S. Appl. No. 16/863,557, dated Apr. 7, 2022, 18 pages.

Non-Final Office Action, U.S. Appl. No. 16/863,557, dated Aug. 25, 2022, 18 pages.

Non-Final Office Action, U.S. Appl. No. 17/104,537, dated Jul. 20, 2022, 16 pages.

Non-Final Office Action, U.S. Appl. No. 17/326,070, dated Aug. 16, 2022, 20 pages.

Non-Final Office Action, U.S. Appl. No. 14/677,493, dated May 1, 2017, 25 pages.

Non-Final Office Action, U.S. Appl. No. 17/185,612, dated Sep. 16, 2022, 10 pages.

Non-Final Office Action, U.S. Appl. No. 17/513,595, dated Dec. 30, 2022, 15 pages.

* cited by examiner

TRANSLATING SECURITY ACTIONS INTO COMPUTING ASSET-SPECIFIC ACTION PROCEDURES

RELATED APPLICATIONS

This application is a continuation of, and claims the benefit of priority to, U.S. patent application Ser. No. 16/539,918, filed Aug. 13, 2019, which is a continuation of U.S. patent application Ser. No. 16/107,975, filed on Aug. 21, 2018, issued as U.S. Pat. No. 10,425,441, which is a continuation of U.S. application Ser. No. 15/699,454, filed on Sep. 9, 2017, issued as U.S. Pat. No. 10,158,663, which is a continuation of U.S. application Ser. No. 14/689,973, filed on Apr. 17, 2015, entitled "INCIDENT RESPONSE AUTOMATION ENGINE," issued as U.S. Pat. No. 9,762,607, which itself claims priority to U.S. Provisional Patent Application No. 62/087,025, entitled "ACTION RECOMMENDATIONS FOR COMPUTING ASSETS BASED ON ENRICHMENT INFORMATION," filed on Dec. 3, 2014, U.S. Provisional Patent Application No. 62/106,830, entitled "ACTION RECOMMENDATIONS FOR ADMINISTRATORS IN A COMPUTING ENVIRONMENT," filed on Jan. 23, 2015, and U.S. Provisional Patent Application No. 62/106,837, entitled "SECURITY ACTIONS IN A COMPUTING ENVIRONMENT," filed on Jan. 23, 2015, all of which are hereby incorporated by reference in their entirety.

TECHNICAL FIELD

Aspects of the disclosure are related to computing environment security, and in particular to managing the allocation of security actions to computing assets with various configurations.

TECHNICAL BACKGROUND

An increasing number of data security threats exist in the modern computerized society. These threats may include viruses or other malware that attacks the local computer of the end user, or sophisticated cyber attacks to gather data and other information from the cloud or server based infrastructure. This server based infrastructure includes real and virtual computing devices that are used to provide a variety of services to user computing systems, such as data storage, cloud processing, web sites and services, amongst other possible services. To protect applications and services, various antivirus, encryption, and firewall implementations may be used across an array of operating systems, such as Linux and Microsoft Windows.

Further, some computing environments may implement security information and event management (SIEM) systems and other security detection systems to provide analysis of security alerts generated by network hardware and applications. In particular, SIEM systems allow for real-time monitoring, correlation of events, notifications, and console views for end users. Further, SIEM systems may provide storage logs capable of managing historical information about various security events within the network. Although SIEMs and other security threat identifying systems may generate security alerts for devices within the network, administrators may be forced to translate each of these alerts into particular actions, which take time and resources.

Overview

The technology disclosed herein enhances how security actions are implemented within a computing environment. In one example, a method of implementing security actions for a computing environment comprising a plurality of computing assets includes identifying a security action in a command language for the computing environment. The method further provides identifying one or more computing assets related to the security action, and obtaining hardware and software characteristics for the one or more computing assets. The method also includes translating the security action in the command language to one or more action procedures based on the hardware and software characteristics, and initiating implementation of the one or more action procedures in the one or more computing assets.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
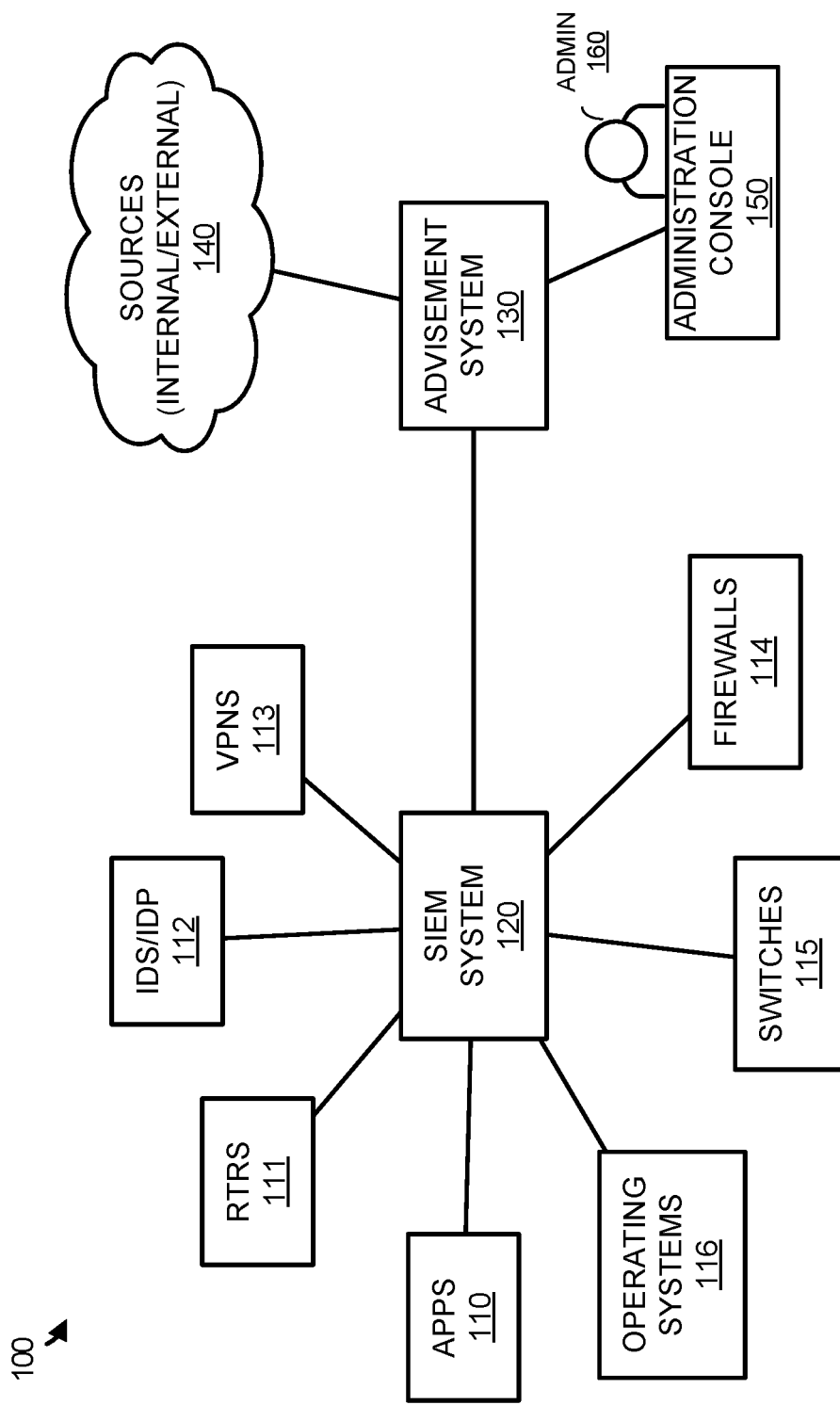
FIG. 1 illustrates a computing environment to manage security actions for a plurality of network assets.

The various examples disclosed herein provide enhancements for implementing security actions in computing assets with various hardware and software configurations. In many organizations, security systems, such as security information and event management (STEM) systems provide analysis of security alerts generated by network hardware and processes. The network hardware and processes may include routers, firewalls, operating systems and applications executing on one or more computing devices, switches, or intrusion detection systems, amongst a variety of other network devices and processes. During the analysis of the particular network, a SIEM system may identify an issue, and flag the issue as a possible security threat. Once flagged, the STEM system may provide information to an administrator, or store information about the threat to be analyzed for a possible solution.

Here, in addition to the operations provided by the STEM system or other security monitoring systems within a computing environment, an advisement system may be used to identify, implement, and recommend security actions to be taken against security threats. In particular, the advisement system may generate actions to be implemented in computing assets with varying software and hardware configurations. For example, a first computing asset may include a firewall from a first software distributor, while a second computing asset within the same environment may include a firewall from a second software distributor. Accordingly, to implement a security action within the first and second computing assets, the advisement system might be required to use multiple command procedures, which are specific to the firewalls on the individual computing assets.

In some implementations, the advisement system may allow administrators to provide actions in a unified command language that can be translated as necessary into the various procedures necessary for the computing assets in the environment. Consequently, rather than developing commands in each of the command languages necessary for the various assets in the environment, an administrator may use a single language for all of the assets in the environment. Referring to a firewall implementation, if an internet protocol (IP) address is to be blocked on multiple computing devices, the unified language could specify the IP address and the computing assets for the action implementation. Once specified, the command may be translated into the necessary sets of procedures to implement the IP block on the computing systems.

In some examples, the unified language for the computing environment may include various characters and symbols. However, in other implementations, the administrator may use a visual programming language to specify particular security actions. This visual programming language may include visual representations of computing assets, visual representations of communication interactions with the computing assets, or any other similar visual representation. For example, the user may select visual representations of two computing assets, and specify, via links or other symbols, that the assets should do no longer communicate with one another. In some implementations, to prevent future communications the administrator may draw or connect a link on a user interface that represents a blocked communication between the two assets. However, it should be understood that to prevent future communications the user might provide a written command to implement the same action.

To further illustrate the operation of an advisement system within a computing network, FIG. 1 is provided. FIG. 1 illustrates a computing environment 100 to manage security actions for a plurality of network assets. Computing environment 100 includes computing assets 110-116, STEM system 120, advisement system 130, sources 140, and administration console 150. Computing assets 110-116 include applications 110, routers 111, intrusion detection systems and intrusion prevention system (IDS/IDP) 112, virtual private networks (VPNs) 113, firewalls 114, switches 115, and operating systems 116, although other assets may exist. Assets 110-116 may execute via any number of computing systems or devices. In addition to the routers and switches, these computing devices may include server computers, desktop computers, laptop computers, tablet computers, and the like. Although not illustrated in the present example, in some implementations, assets may be defined at computing system level. Accordingly, assets may be defined as physical computing systems, such as servers, end user computing systems, host computing systems, and the like, and may further be defined as virtual processing systems, such as virtual machines or containers executing via host computing systems. These physical and virtual computing systems may include an operating system, applications, processes, firewalls, and other similar computing resources.

SIEM system 120, advisement system 130, internal and external sources 140, and administration console 150 may each include communication interfaces, network interfaces, processing systems, computer systems, microprocessors, storage systems, storage media, or some other processing devices or software systems, and can be distributed among multiple devices. STEM system 120, advisement system 130, and sources 140 may comprise one or more server, desktop, laptop, or other similar computing devices. Administration console 150 may comprise an end user device, such as a desktop computer, laptop computer, smartphone, tablet, or any other similar computing device.

Advisement system 130 communicates with SIEM system 120, sources 140, and administration console 150 via communication links that may use Time Division Multiplex (TDM), asynchronous transfer mode (ATM), internet protocol (IP), Ethernet, synchronous optical networking (SONET), hybrid fiber-coax (HFC), circuit-switched communication signaling, wireless communications, or some other communication format, including combinations and improvements thereof. Similarly, STEM system 120 may gather information from assets 110-116 via a plurality of communication links to the computing systems associated with the assets, wherein the links may use TDM, ATM, IP, Ethernet, SONET, HFC, circuit-switched communication signaling, wireless communications, or some other communication format, including combinations and improvements thereof. While not illustrated in the present example, it should be understood that advisement system 130 might communicate with the assets over various communication links and communication formats to implement desired security actions.

In operation, SIEM system 120 receives data and performance information from assets 110-116 and performs inspections to identify possible security issues. Once SIEM system 120 identifies a possible security threat, information about the security threat is transferred to advisement system 130. Advisement system 130 identifies the security threat and analyzes the threat using sources 140 to determine actions against the security threat. These actions might include default actions that can be initiated and implemented within the environment without interaction from an administrator, and might further include suggested actions that can be provided to administrator (admin) 160. Once the suggested actions are determined, the suggested actions are transferred, via email, text message, or other similar format, to administration console 150 to be presented to administrator 160. From the suggested actions, administrator 160 may select a particular action and advisement system 130 may implement the action within the computing environment.

In some implementations, to select a particular action, the administrator may use a unified security language to implement actions in a variety of hardware and software configurations. Once the administrator enters a command using the unified language, the language may be translated into the one or more processes or languages necessary to implement the action within the computing environment. For example, the administrator may select to remove a particular malicious process from multiple computing systems with different software configurations. Accordingly, advisement system 130 may be used to translate the command from the administrator into the necessary processes to remove each instance of the malicious process on the varying computing systems.

Figure 2:
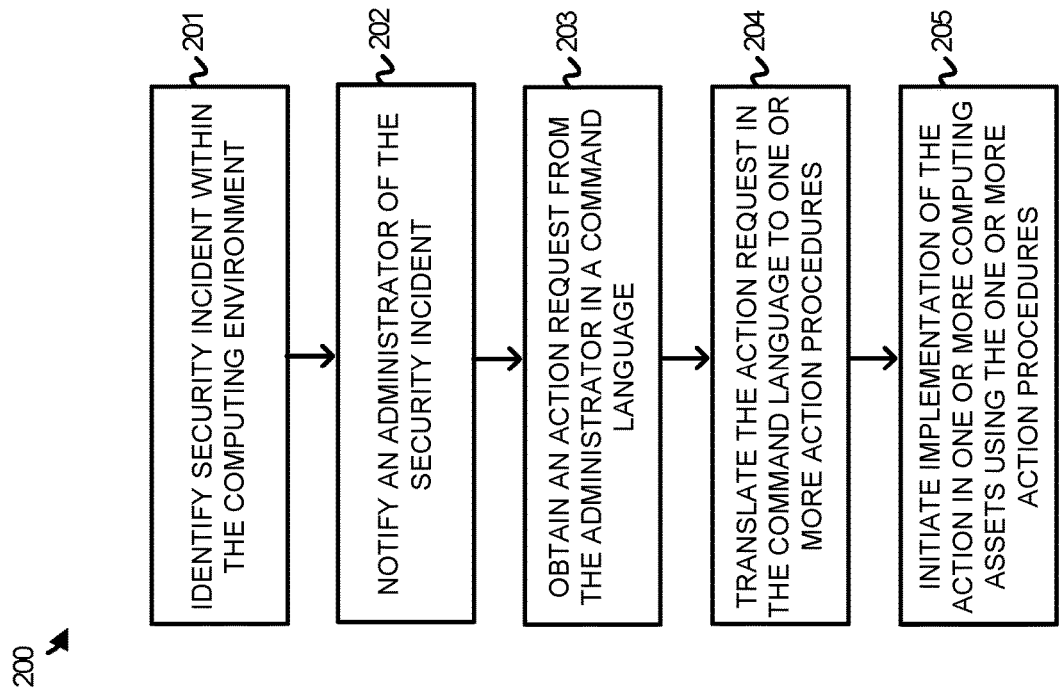
FIG. 2 illustrates a method of operating an advisement system to implement security actions.

Referring now to FIG. 2 to further demonstrate the operation of advisement system 130. FIG. 2 illustrates a method 200 of operating advisement system 130 to implement security actions. As described above in FIG. 1, STEM system 120 receives information from a plurality of network assets 110-116 and identifies security threats to devices and systems based on the information. Once a threat is recognized, information about the threat is transferred to, and identified by, advisement system 130 (201). In response to identifying the threat, advisement system 130 notifies administrator 160 of the security incident (202). In some implementations, to notify administrator 160, advisement system 130 may provide information about the security threat, including the asset associated with the threat, the IP address associated with the threat, the severity level of the threat, the number of assets affected by the threat, or other similar information. This information may be gathered from STEM system 120, may be gathered from the assets within computing environment 100, or may be gathered from internal and external sources 140 related to the particular incident. For example, enrichment information may be gathered from a web database regarding an unknown process executing on a computing system. In addition to or in place of the information about the threat, advisement system 130 may further provide action recommendations to administrator 160 based on gathered enrichment information. These action recommendations may include separating the affected asset from the other assets within the environment, removing a particular threat from a computing asset, blocking one or more IP addresses related to a threat, or any other similar action to protect the assets in computing environment 100.

Once the information is provided to administrator 160, advisement system 130 may obtain an action request from administrator 160 in a command language (203). As illustrated in FIG. 1, advisement system 130 may provide information to administration console 150 via a web based console, a text message, an email, or some other similar form of communication. In response to receiving the information about the threat, administrator 160 may use a command language to implement a security modification to counter the security threat. For example, the user may select to block a particular IP address from communicating with one or more assets within the environment.

Upon identifying the action request from administrator 160, advisement system 130 translates the action request in the command language to one or more action procedures (204). To translate the command, advisement system 130 may identify the hardware and software configurations for the assets associated with the action request. For example, the administrator may request that an IP address is blocked in a firewall for two computing systems. In response to the request, advisement system 130 may identify the hardware and software configurations for the two computing systems, and translate the action into procedures required by the two computing systems. Once the command is translated, advisement system 130 may initiate implementation of the action in the required computing assets using the one or more identified procedures (205).

In some examples, to implement the actions within each of the computing assets, procedures may need to be executed with indefinite time delays. For instance, to implement a firewall action within the computing environment, advisement system 130 may be required to log into the computing asset, and transfer one or more commands to the computing asset to block the required address. Accordingly, advisement system 130 may be configured to wait until each process is completed, such as waiting to be logged into the computing asset before applying the procedures necessary to block the IP address.

Although illustrated in FIG. 1 with a STEM system, it should be understood that in some examples, other systems, such as the assets themselves within the computing environment, might be used to identify security threats. Further, although illustrated separate in the example of FIG. 1, it should be understood that STEM system 120 might reside wholly or partially on the same computing systems as advisement system 130.

Figure 3:
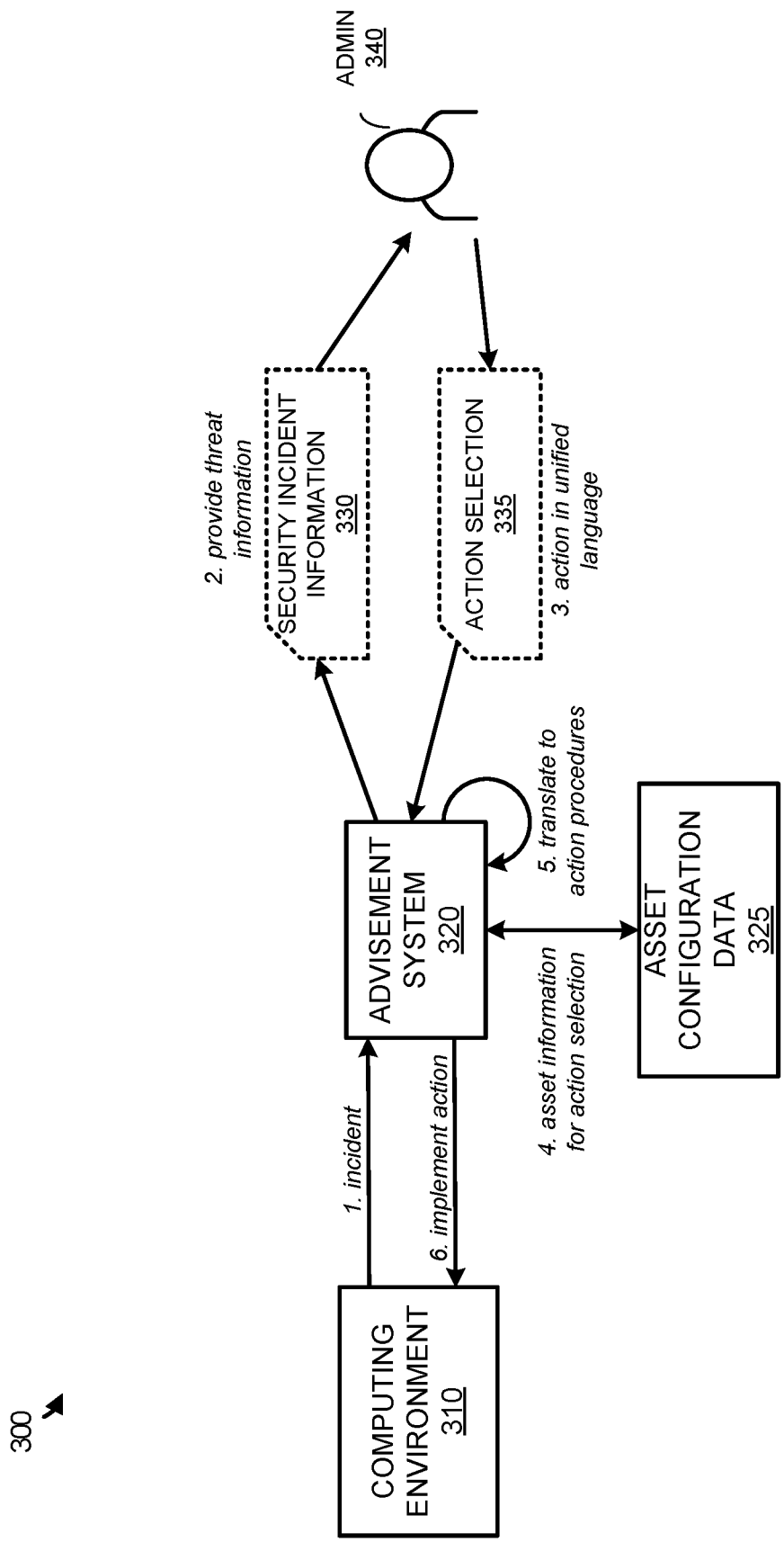
FIG. 3 illustrates an operational scenario of implementing security actions in a computing environment.

Turning to FIG. 3, FIG. 3 illustrates an operational scenario 300 of implementing security actions in a computing environment according to one implementation. Operational scenario 300 includes computing environment 310, advisement system 320, asset configuration data 325, security incident information 330, action selection 335, and administrator (admin) 340. Computing environment 310 includes a plurality of computing assets, which may comprise end user computing systems, routers, switches, firewalls, or any other similar computing asset.

As illustrated in FIG. 3, advisement system 320 initially identifies a security incident within computing environment 310. This security incident may be identified from one of the computing assets directly, or may be identified by a security monitoring system, such as SIEM systems that monitor security threats within the various computing assets. Once the incident is identified by advisement system 320, advisement system 320 may provide security incident information 330 to administrator 340. In some implementations, security incident information 330 may be provided via a user interface on advisement system 320. However, in other instances, security incident information 330 may be provided as a text message, email correspondence, web view, or other similar interface at an administration console for administrator 340. Security incident information 330 may include information about the asset affected by the threat, an IP address related to the source of the threat, information about a process related to the threat, a severity level of the threat, or some other similar information. This information may be obtained directly from the assets and security management systems, and may further be supplemented with enrichment information gathered from internal and external sources. For example, if an unknown process were identified on one of the computing assets, advisement system 320 may query a database to identify whether the process was malicious. Once the inquiry is made, the information returned from the database may be provided in security incident information 330. In some implementations, in addition to or in place of the information gathered about the threat, advisement system 320 may determine suggested actions that can be provided to administrator 340. These suggested actions may include removing a particular malicious process, entering one or more computing assets into virtual local area network (VLAN), blocking particular IP addresses, or some other similar action recommendation based on the threat and possible enrichment information.

Once security incident information 330 is provided to administrator 340, administrator 340 may generate action selection 335. Here, action selection 335 comprises a selection made in a unified command language for all assets within the environment. Once action selection 335 is identified by advisement system 320, advisement system 320 may obtain hardware and software configuration information based on the action selection. For example, action selection 335 may include a request to remove a particular process from multiple computing assets within computing environment 310. In response to the request, advisement system 320 may use asset configuration data 325 to determine software and hardware characteristics for the relevant computing assets. Once the characteristics are obtained, advisement system 320 may translate action selection 335 into one or more action procedures that correspond to the software and hardware configurations of the assets.

Returning to the example of removing a particular process from multiple computing assets, each of the computing assets may have a different hardware or software configuration. As a result, the procedures necessary to implement the action may be different for each of the assets. Rather than requiring administrator 340 to provide procedural commands for each of the computing assets, advisement system 320 may be used to translate an action selection into the commands for the various asset configurations. Upon translating action selection 335 into the required procedures, advisement system 320 may implement the action on the corresponding assets in computing environment 310.

In some examples, the procedures to implement a particular action within an asset may have indefinite time delays between each step of the procedure. For instance, to implement a firewall modification, advisement system 320 may be required to login to the relevant asset before providing commands to the asset. Accordingly, advisement system 320 may implement wait conditions that allow each step of the action procedures to be implemented without further interaction from the administrator.

Figure 4:
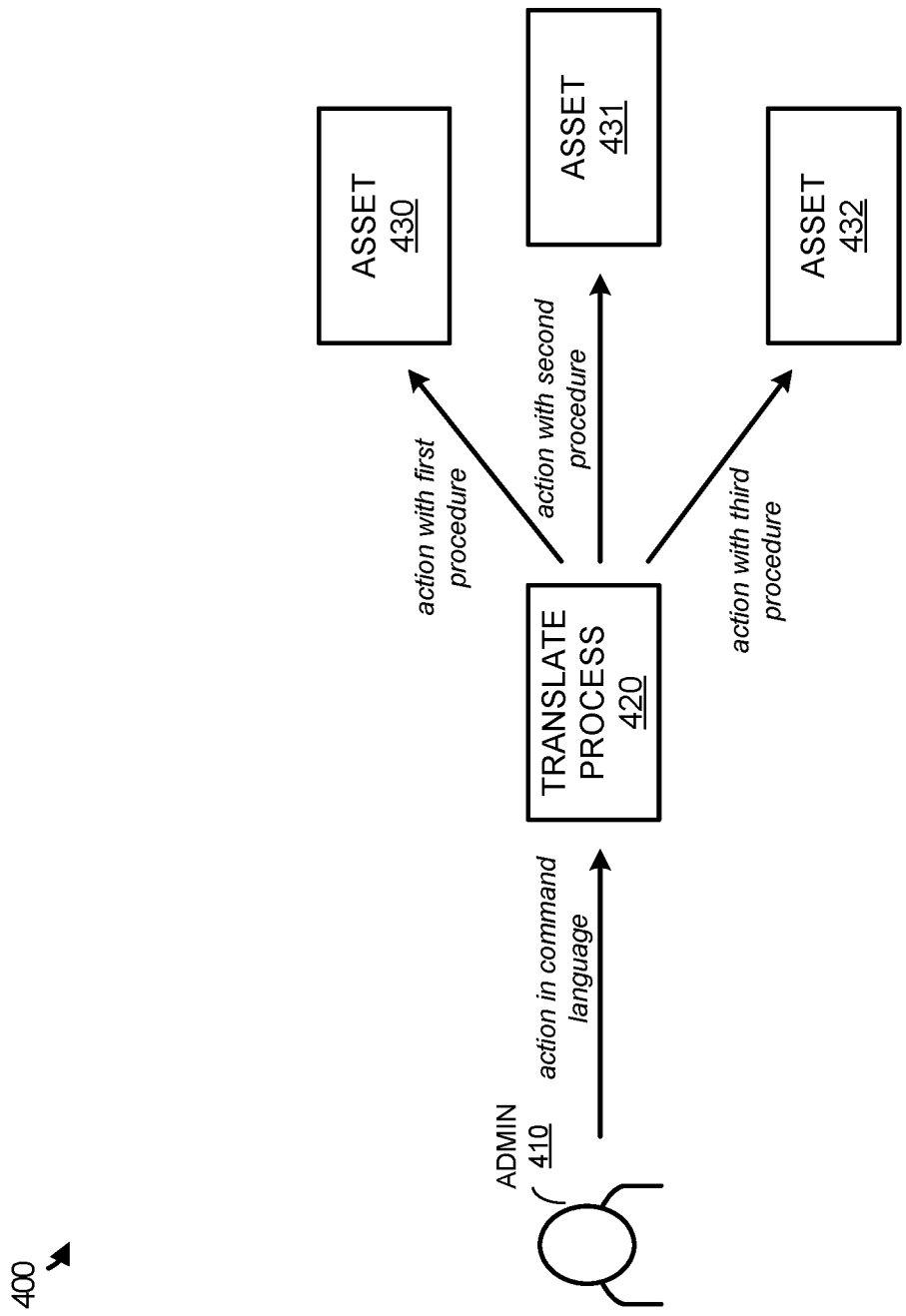
FIG. 4 illustrates a flow diagram of implementing a security action in multiple computing assets.

Turning to FIG. 4, FIG. 4 illustrates a flow diagram 400 of implementing a security action in multiple computing assets. Flow diagram 400 includes administrator 410, translate process 420, and assets 430-432. Translate process 420 is representative of a process to be implemented on advisement system 130 or advisement system 320, although translate process 420 may be implemented on other computing systems. Assets 430-432 are representative of any computing asset within a computing environment, including end user computing systems, server computing systems, routers, switches, firewalls, virtual computing elements, or any other similar asset.

As described herein, computing environments include a plurality of computing assets that may encounter security incidents. To respond to the incidents, an advisement system may provide information about the threats or incidents to administrator 410, allowing the administrator to implement an action against the threat. This information may be obtained from the individual assets, from security monitoring systems within the environment, or may be supplemented with enrichment information obtained from one or more internal or external sources. The information provided to administrator 410 may include identifiers for the assets related to the incident, IP addresses related to the incident, files or processes related to the incident, indications of the severity of the incident within the environment, or any other similar information.

Once the information is provided to administrator 410, the administrator may select an action to be taken against the threat within the environment. In particular, the administrator may use a unified command language that can be used to implement security actions across a plurality of assets within the environment, including assets with different software and/or hardware configurations. For example, the unified command language may include a structure for implementing actions within the environment, including asset identifiers for assets that require the modification, as well as one or more commands to be applied to the assets that require the modification.

Once the administrator inputs the particular action selection via a user interface on the advisement system or a separate administration console device, the advisement system identifies the action in the unified command language and translates the action to one or more action procedures based on the asset configurations. In particular, the advisement system may obtain software and hardware characteristics for each of the computing assets involved in the security action. Once the characteristics are obtained, the advisement system may translate the user generated action into the necessary procedures for the various computing assets. As depicted in FIG. 4, the action generated by administrator 410 requested modifications to assets 430-432. Accordingly, translate process 420 translates the request from the administrator in the unified language into the required procedures for assets 430-432. In the present example, each of assets 430-432 require a different set of procedures, which may occur as a result of different software or hardware configurations on the computing assets. For example, if administrator 410 desired a firewall implementation in assets 430-432, translate process 420 may translate the action into the necessary parameters and procedures for each individual firewall for the computing assets.

In some implementations, the advisement system for a computing environment may have access to a database of connectors or software modules that can be used to translate the various commands from the administrator. For example, when firewall software is distributed, a connector may be generated for the firewall that allows commands in the unified language to modify a configuration of the firewall. Accordingly, when a command is generated for an asset with the new firewall distribution, the new connector may be used to implement the required procedures.

Figure 5:
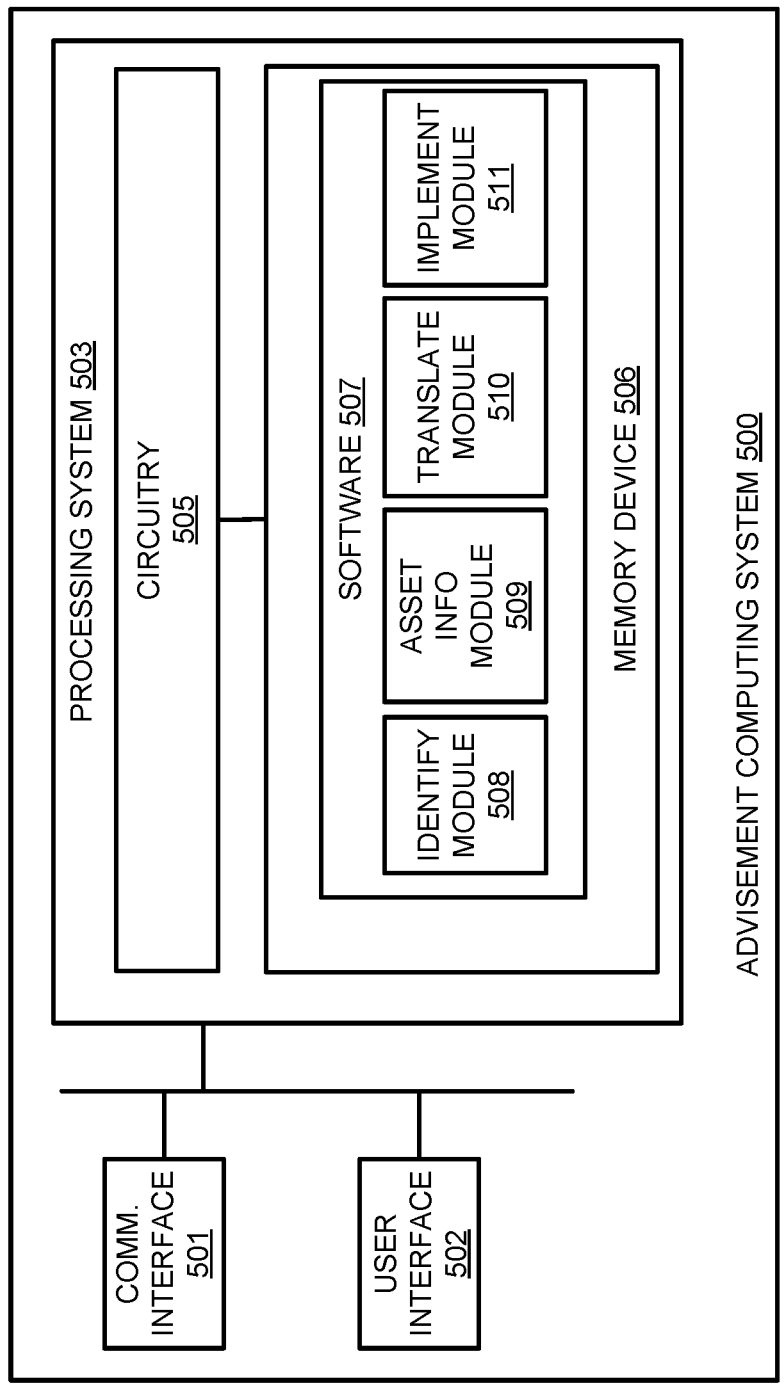
FIG. 5 illustrates an advisement computing system to implement security actions in a computing environment.

Turning to FIG. 5, FIG. 5 illustrates an advisement computing system 500 to provide action recommendations for a plurality of network assets. Advisement computing system 500 is representative of a computing system that may be employed in any computing apparatus, system, or device, or collections thereof, to suitably implement the advisement systems described herein. Computing system 500 comprises communication interface 501, user interface 502, and processing system 503. Processing system 503 is communicatively linked to communication interface 501 and user interface 502. Processing system 503 includes processing circuitry 505 and memory device 506 that stores operating software 507.

Communication interface 501 comprises components that communicate over communication links, such as network cards, ports, radio frequency (RF) transceivers, processing circuitry and software, or some other communication devices. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof. In particular, communication interface 501 may communicate with security identification systems, such as STEM systems, security monitoring processes on the assets themselves, or some other security identification system. Further, communication interface 501 may be configured to communicate with one or more administration consoles to provide the suggested actions to administrators, and may also communicate with the computing assets of the environment to implement selected actions.

User interface 502 comprises components that interact with a user. User interface 502 may include a keyboard, display screen, mouse, touch pad, or some other user input/output apparatus. User interface 502 may be omitted in some examples.

Processing circuitry 505 comprises microprocessor and other circuitry that retrieves and executes operating software 507 from memory device 506. Memory device 506 comprises a non-transitory storage medium, such as a disk drive, flash drive, data storage circuitry, or some other memory apparatus. Operating software 507 comprises computer programs, firmware, or some other form of machine-readable processing instructions. Operating software 507 includes identify module 508, asset information (info) module 509, translate module 510, and implement module 511, although any number of software modules may provide the same operation. Operating software 507 may further include an operating system, utilities, drivers, network interfaces, applications, or some other type of software. When executed by circuitry 505, operating software 507 directs processing system 503 to operate advisement computing system 500 as described herein.

In particular, identify module 508 directs processing system 503 to identify a security action in a command language for the computing environment. In response to the security action, asset info module 509 directs processing system 503 to identify one or more computing assets related to the security action, and obtain hardware and software characteristics for the one or more computing assets. Based on the hardware and software characteristics, translate module 510 directs processing system 503 to translate the security action in the command language to one or more action procedures based on the hardware and software characteristics. For example, a computing environment may include a variety of different hardware with a variety of different software configurations. Accordingly, if the security action comprised an action to be implemented across multiple devices, different procedures may be required for each of the devices. Rather than requiring an administrator to manually implement the various procedures, computing system 500 may be used to translate a security action to the required procedures for various software and hardware configurations. Once the security action is translated, implement module 511 directs processing system 503 to initiate implementation of the one or more action procedures in the one or more computing assets.

In some implementations, advisement computing system 500 may have access to one or more connectors or modules that can be used to interface with the various hardware and software within the computing environment. For example, a security action from an administrator may select to implement a firewall to be applied across multiple computing assets with multiple hardware and/or software configurations. In response to identifying the action, computing system 500 may identify hardware and software characteristics for the computing assets that require the modification, and translate the action based on the characteristics. For example, a first connector may specify the action procedures for a computing system with a first firewall distribution, whereas a second connector may specify the action procedures for a computing system with a second firewall distribution.

Although not illustrated in the present example, in some instances, advisement computing system 500 may be configured to notify an administrator of a security threat within the environment. This notification may include the identity of the asset affected by the threat, the severity of the threat within the environment, the IP address associated with the threat, the process name associated with the threat, or any other similar information. The information may be obtained directly from the assets in the environment, a security system configured to monitor for security issues within the environment, or may be obtained from internal and external sources. For example, computing system 500 may identify a security issue within the computing environment. In response to the security issue, processing system 503 may be configured to query internal and external sources for enrichment data regarding the threat. Accordingly, if an unknown process were identified as executing on a computing asset, processing system 503 may query a database to determine if the process is malicious. Once the information is retrieved, the information may be provided to the administrator with the notification, allowing the administrator to generate a security action in the environment.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computer-implemented method comprising:
    identifying, by an advisement system, a security incident associated with a computing environment including a plurality of computing assets;
    identifying, by the advisement system, a security action to be used to mitigate the security incident, wherein implementation of the security action involves interacting with a computing asset of the plurality of computing assets;
    identifying a connector used to interface with the computing asset;
    using the connector to translate the security action into an action procedure used to perform the security action at the computing asset; and
    initiating implementation of the action procedure at the computing asset.

2. The computer-implemented method of claim 1, wherein the plurality of computing assets includes at least one of: a server, an end user computing system, a router, a switch, or a virtual processing system.

3. The computer-implemented method of claim 1, wherein the security action is a first security action, the computing asset is a first computing asset, the connector is a first connector, the action procedure is a first action procedure, and wherein the method further comprises:
    identifying, by the advisement system, a plurality of security actions to be used to mitigate the security incident, wherein the plurality of security actions includes the first security action and a second security action, and wherein implementation of the second security action involves interacting with a second computing asset of the plurality of computing assets;
    identifying a second connector used to interface with the second computing asset;
    using the second connector to translate the second security action into a second action procedure used to perform the second security action at the second computing asset; and
    initiating implementation of the second action procedure at the computing asset.

4. The computer-implemented method of claim 1, wherein the security action represents performing at least one of: blocking an internet protocol (IP) address, terminating a process running on a computing asset, or adding a computing asset to a virtual local area network (VLAN).

5. The computer-implemented method of claim 1, wherein the security incident is identified based on information generated by a security detection system that monitors the plurality of computing assets.

6. The computer-implemented method of claim 1, wherein the security action to be used to mitigate the security action is identified based on data obtained by the advisement system describing the security incident, wherein the data describing the security incident includes at least one of: identification of a computing asset affected by the security incident, an internet protocol (IP) address related to a source of the security incident, a process related to the security incident, or a severity level of the security incident.

7. The computer-implemented method of claim 1, further comprising obtaining enrichment information for the security incident from one or more internal or external sources, wherein the enrichment information is used by the advisement system to identify the security action to be used to mitigate the security incident.

8. The computer-implemented method of claim 1, wherein the connector translates the security action into a plurality of action procedures used to perform the security action at the computing asset, and wherein each action procedure of the plurality of action procedures is implemented in a defined order relative to other action procedures of the plurality of action procedures.

9. The computer-implemented method of claim 1, further comprising causing display of a visual representation of at least a portion of the computing environment including the computing asset.

10. The computer-implemented method of claim 1, further comprising obtaining enrichment information related to the security incident from one or more internal or external sources, wherein the connector translates the security action is translated into the action procedure based at least in part on the enrichment information.

11. The computer-implemented method of claim 1, further comprising obtaining enrichment information related to the security incident from one or more internal or external sources, wherein the enrichment information including at least one of: information indicating whether a process or file is malicious, or information indication whether an internet protocol (IP) address is malicious.

12. The computer-implemented method of claim 1, wherein the security incident includes at least one of: a virus, malware, or a network-based attack.

13. The computer-implemented method of claim 1, further comprising causing display of a visual representation of at least a portion of the computing environment, wherein the visual representation of at least a portion of the computing environment includes a visual representation of communication interactions between at least two computing assets of the plurality of computing assets.

14. The computer-implemented method of claim 1, wherein information related to the security incident is provided to a user via at least one of: an application console, a web-based console, an email, or a text message.

15. The computer-implemented method of claim 1, further comprising obtaining configuration information associated with the computing asset, wherein translating the security action into the action procedure is based at least in part on the configuration information.

16. The computer-implemented method of claim 1, further comprising receiving an indication of the security incident from a security information and event management (SIEM) system.

17. The computer-implemented method of claim 1, wherein the connector is stored in a database accessible to the advisement system, and wherein the connector includes code executable by the advisement system to translate the security action into the action procedure.

18. The computer-implemented method of claim 1, wherein the connector is associated with a type of computing asset, and the connector is identified based on determining that the computing asset is associated with the type of computing asset.

19. A non-transitory computer-readable storage medium storing instructions which, when executed by one or more processors, cause performance of operations comprising:
    identifying, by an advisement system, a security incident associated with a computing environment including a plurality of computing assets;
    identifying, by the advisement system, a security action to be used to mitigate the security incident, wherein implementation of the security action involves interacting with a computing asset of the plurality of computing assets;
    identifying a connector used to interface with the computing asset;
    using the connector to translate the security action into an action procedure used to perform the security action at the computing asset; and
    initiating implementation of the action procedure at the computing asset.

20. An apparatus, comprising:
    one or more processors;
    a non-transitory computer-readable storage medium storing instructions which, when executed by the one or more processors, cause the apparatus to:
        identify, by an advisement system, a security incident associated with a computing environment including a plurality of computing assets;
        identify, by the advisement system, a security action to be used to mitigate the security incident, wherein implementation of the security action involves interacting with a computing asset of the plurality of computing assets;
        identify a connector used to interface with the computing asset;
        use the connector to translate the security action into an action procedure used to perform the security action at the computing asset; and
        initiate implementation of the action procedure at the computing asset.

* * * * *